Sept. 15, 1942.                T. J. GROSS                 2,296,160
                            TESTING SHEET MATERIALS
                            Filed June 15, 1940          3 Sheets-Sheet 1
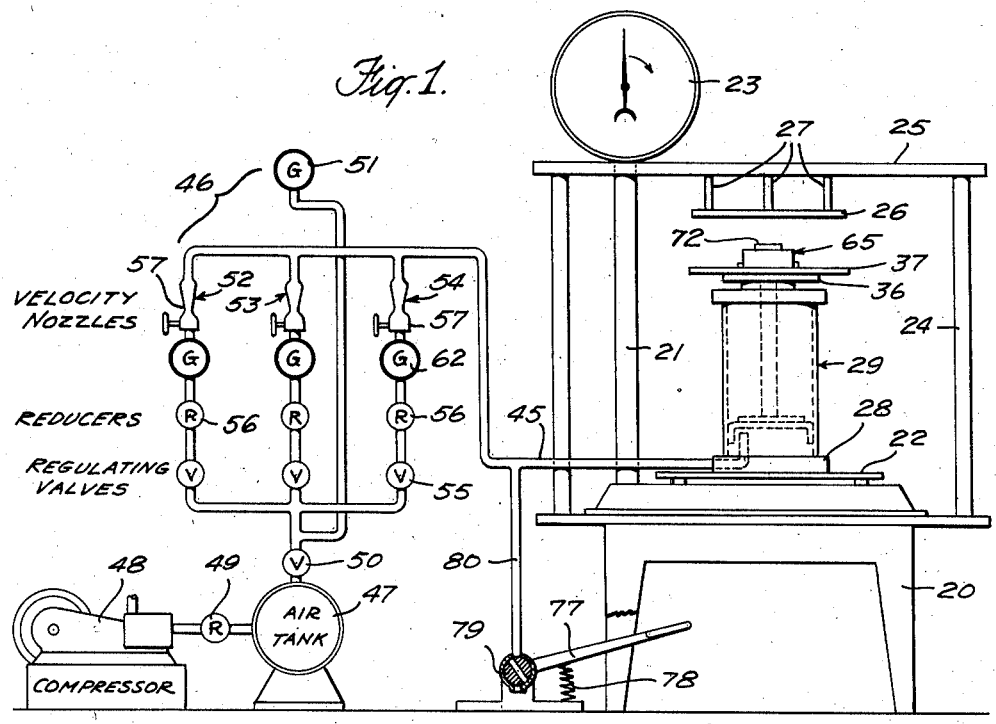
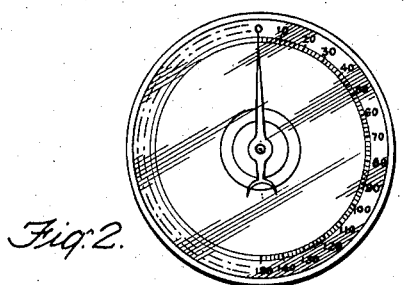
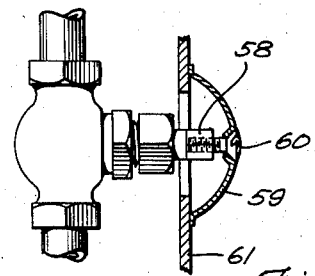
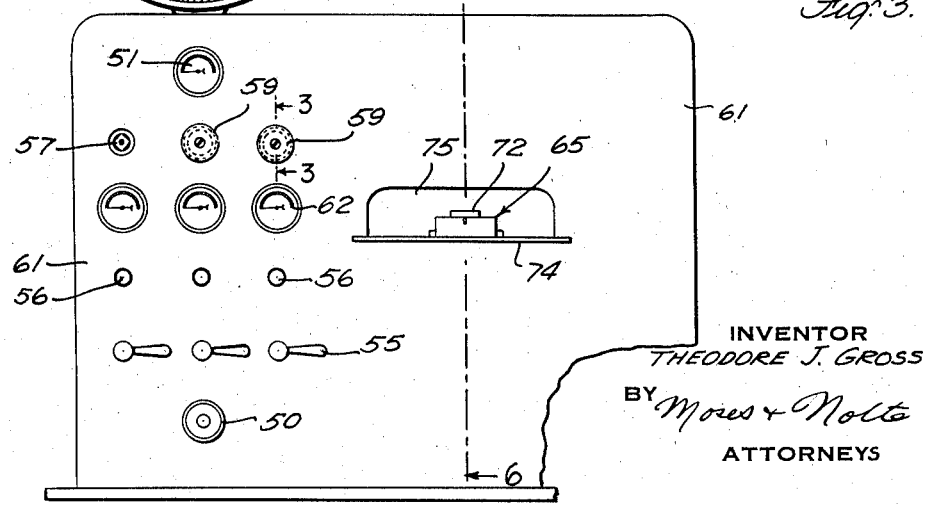
INVENTOR
THEODORE J. GROSS
BY
ATTORNEYS Sept. 15, 1942.  T. J. GROSS  2,296,160
TESTING SHEET MATERIALS
Filed June 15, 1940   3 Sheets-Sheet 2
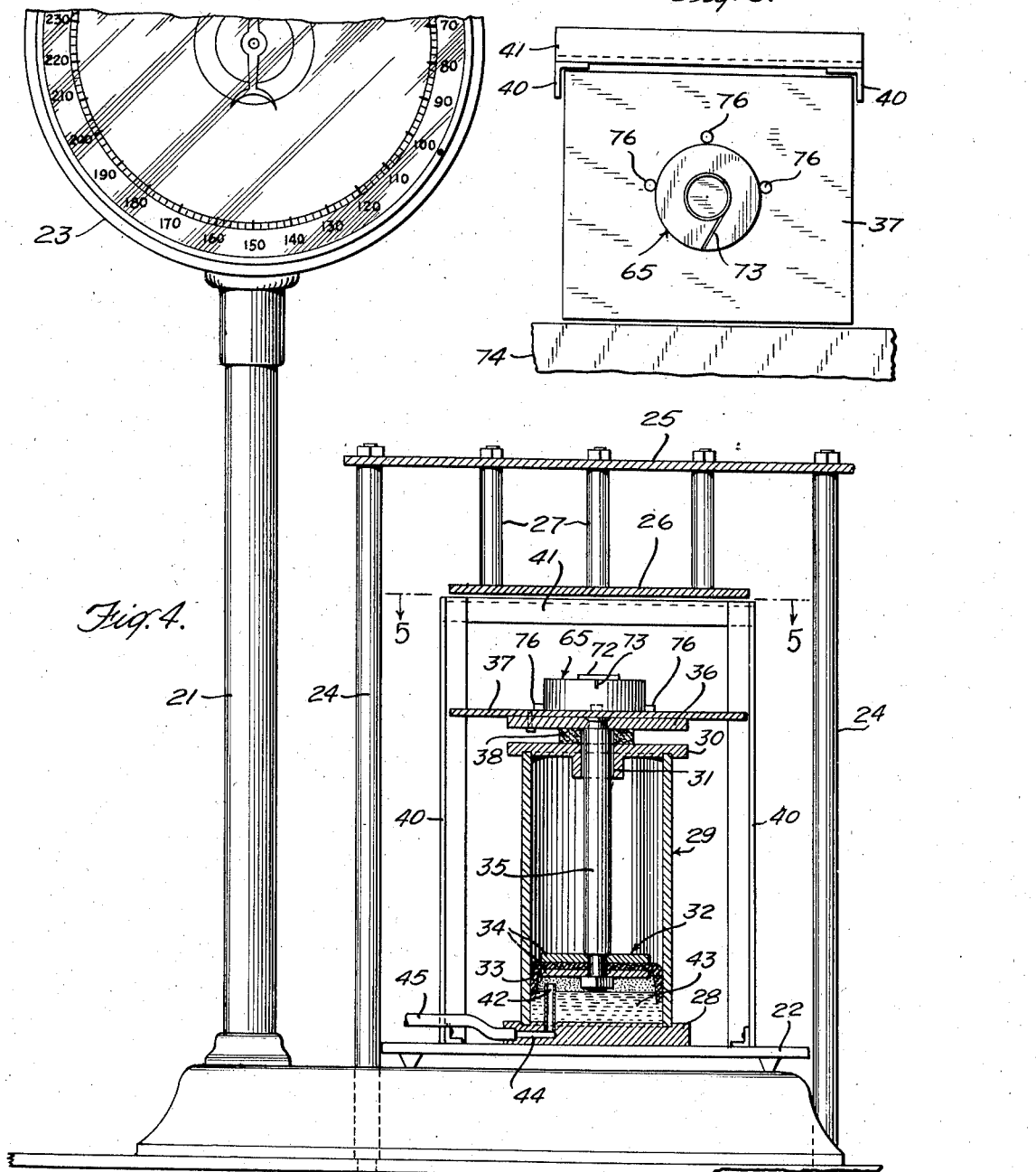
INVENTOR
THEODORE J. GROSS
BY Moses & Nolte
ATTORNEYS Sept. 15, 1942.   T. J. GROSS   2,296,160
TESTING SHEET MATERIALS
Filed June 15, 1940   3 Sheets-Sheet 3
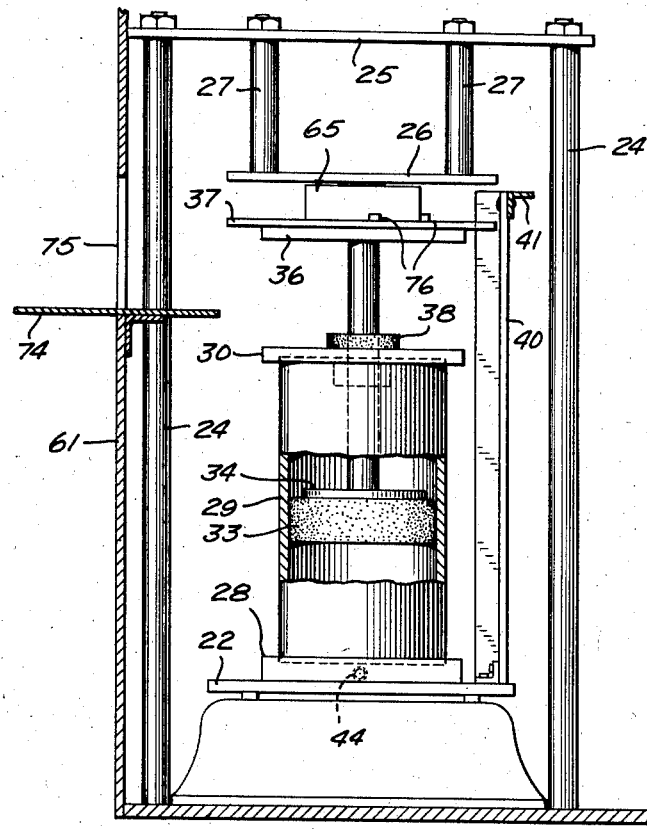
INVENTOR
THEODORE J. GROSS
BY Moses + Nolte
ATTORNEYS Patented Sept. 15, 1942

2,296,160

UNITED STATES PATENT OFFICE 2,296,160

TESTING SHEET MATERIALS

Theodore J. Gross, Baldwin, N. Y., assignor to Container Testing Laboratories, New York, N. Y., a corporation of New York Application June 15, 1940, Serial No. 340,635

2 Claims. (Cl. 265—14)

This invention relates to testing apparatus and is particularly suitable for use in apparatus for testing the resistance of relatively stiff sheet material to crushing strain applied in the plane of the sheet.

The invention has been employed in the testing of liner material used in making corrugated board. Liner material of this type, which ordinarily is made of cardboard, strawboard or other paper pulp product, has heretofore been tested by fitting a marginal portion of a test strip snugly in an annular groove in a test block, and locating the boarded block between two platens, one of which is moved toward the other at a constant rate of speed, generally by a worm drive, thereby applying edgewise pressure to the projecting portion of the strip until the material fails by crumpling or crushing, the pressure at which the material fails being read from a suitable indicator.

The general purpose of the invention is to provide an arrangement for tests of this type which will give uniform and reliable results and which is convenient and rapid in operation. The accuracy and uniformity of the testing results have been improved by providing means for applying a fixed uniform pressure, and for controlling the rate of application of such pressure.

With the usual worm drive type of testing apparatus the rate of movement of the crushing platen is uniform regardless of variations in the resistance presented by the test strip. It has been found that the strip under these conditions may undergo partial failures before it finally collapses. As the rate of travel of the crushing platen is uniform, the indicator will show a drop in resistance at each partial failure, and will then start to rise again as the uniform advance of the platen builds up the pressure on the strip.

An important feature of the invention is the provision of an arrangement for applying the desired pressure, and particularly the requisite steady increase in said pressure, that is not dependent solely upon the rate of movement of the platen to produce pressure, and which in practice may be rendered substantially independent thereof. With this arrangement the sample is subjected to a uniformly increasing pressure regardless of partial failures or inequality in yielding, and the applied pressure is not materially dependent upon the rate at which the sample yields. Moreover, the movement of the indicator is relatively steady and uniform, facilitating the rapid and accurate determination of the true pressure at complete failure.

This result is in general accomplished by applying fluid pressure to the crushing member, and in particular by the use of suitably controlled pneumatic means. A feature is the provision of a controlled arrangement facilitating the application of steadily increasing pressure at an appropriate rate, independently of the rate of yielding of the test piece. It has been found that for accurate and uniform testing results the rate of increase of testing pressure on a given sample should be regulated. The invention includes an arrangement whereby this may be conveniently accomplished, and which also permits adjustment of the rate of testing pressure increase to suit particular conditions or materials. Stronger materials are capable of withstanding a pressure increase at a higher rate without sacrificing uniformity and accuracy of results; and it is desirable to apply the pressure to such materials at a more rapid rate in order to reduce the total testing time. A feature of the invention is the provision of an arrangement whereby the pressure may be increased at different rates depending upon the nature of the material, without requiring a special adjustment for each type of material, thereby reducing testing time to a minimum. This is in general accomplished by providing different pneumatic pressures together with control means whereby the appropriate pressure may be applied to a test piece in a given class, the pieces being ordinarily classified by their variations in thickness. This arrangement is particularly convenient for testing corrugated board liner material, since the various pressures may be calibrated to correspond to standard thicknesses of such material.

A further feature of the invention includes an arrangement for bringing the test piece rapidly into operative engagement with the crushing member without excessive impact and without affecting the rate of pressure increase after such contact is established. This is accomplished by employing a suitably controlled fluid pressure system of the type indicated, in which the application of pressure is dependent upon the resistance and not upon the rate of movement, the slight resistance during travel of the test piece from loading to testing position resulting in rapid movement at this stage. This arrangement permits the provision of ample space for inserting and removing test blocks while reducing the testing time by reducing the time required to move each test piece between loading and testing positions.

Another feature of the invention is the provision of an arrangement that is mechanically convenient and adapted for rapid operation without sacrificing testing uniformity and accuracy. The preferred construction is compact and is designed to utilize standard types of apparatus, including particularly well developed pressure or weight indicating devices such as commercial forms of platform scales.

Other objects and advantages will appear from the following description considered in connection with the accompanying drawings in which:

Fig. 1 is a partly diagrammatic front view of the apparatus with the operating panel removed;

Fig. 2 is a similar view of part of the apparatus with the panel in place;

Fig. 3 is a detail showing a velocity nozzle sealing construction;

Fig. 4 is a central vertical section through the pressure applying arrangement associated with a platform scale, shown in loading position;

Fig. 5 is a detail plan view of the testing platform, test block and associated parts taken on line 5—5 of Fig. 4;

Fig. 6 is a detailed side elevation of the pressure applying mechanism with parts broken away, shown in testing position, with the panel in section on line 6—6 of Fig. 2;

Fig. 7 is a fragmentary central vertical section through a portion of the test block showing a test strip in place before testing;

Fig. 8 is a similar view after testing;

Fig. 9 is a face view of the test strip before testing; and

Fig. 10 is a similar view of the strip after testing.

The apparatus as shown in Fig. 1 consists of a platform scale; a pneumatically operated testing unit, part of which is mounted on the scale platform; an air control unit; and an operating panel carrying the air controls and arranged for convenient insertion and removal of test blocks. In the specific embodiment shown, a suitable base 20 carries a platform scale 21 provided with a platform 22 and a dial 23 marked to indicate the number of pounds of pressure on platform 22. A frame 24 mounted on base 20 carries a top plate 25 on which pressure plate 26 is mounted by posts 27 arranged so that plate 26 presents a flat lower surface opposed and parallel to platform 22.

A suitable arrangement for forcing the test pieces against plate 26 is mounted on platform 22. The arrangement shown is of the pneumatically operated plunger type and includes a cylinder base 28 fixed to the platform 22 and carrying a test cylinder 29 having a cover 30 provided with a suitable central bore or guideway 31. A suitable piston 32 is mounted in cylinder 29 and may be of the type employing a cup washer 33 of leather held between clamp plates 34 on the end of piston rod 35, which fits loosely in guideway 31 and carries a support plate 36 on which the horizontal testing platform 37 is mounted. A cushion 38, which may be a thick felt washer, is located between plate 36 and cylinder cover 30 to cushion the descent of the piston after testing.

A suitable guideway to prevent rotation of platform 37 is provided. In the form shown the platform is rectangular and the two rear corners of the platform slide loosely in angle guides 40, fixed firmly at their lower ends to the scale platform 22 and to reenforcing angle 41 connecting their upper ends.

An appropriate arrangement is provided for applying pneumatic pressure beneath piston 32 and releasing the pressure after testing is completed. The arrangement shown includes an air nozzle 42 mounted on cylinder base 28 and extending upwardly for a sufficient distance to clear the layer of oil 43 normally maintained in the base of cylinder 29. The parts are arranged so that the skirt of washer 33 dips into oil 43 when the piston is in its lowermost position, thereby maintaining the washer skirt in soft and effective sealing condition. An air passage 44 in cylinder base 28 connects nozzle 42 with an air line 45 connected through suitable control apparatus indicated generally at 46 to air supply tank 47 fed by compressor 48.

The control apparatus 46 includes means for regulating the pressure of the air fed to line 45 and means for regulating the rate at which air is supplied to said line. The illustrated embodiment includes a pressure reducing valve 49 of known type adapted to maintain a predetermined pressure in tank 47; main valve 50; a pressure gauge 51 connected to the discharge side of valve 50; and three control lines 52, 53 and 54 extending in parallel between valve 50 and line 45. Each control line is similarly arranged, and includes a control valve 55, a pressure reducing valve 56, a pressure gauge 62, and a velocity control nozzle 57. The valve and nozzle stems are accessible from the front of panel 61, and gauges 51 and 62 are mounted on and visible from the front of said panel.

It has been found that for reliable test results the rate at which pressure is applied to a testing strip is of primary importance; moreover, great uniformity in the rate of application of pressure to succeeding strips is also important in obtaining comparable results. Each control nozzle 57, which comprises a suitable valve, is adjusted by turning valve stem 58 (Fig. 3) until the proper rate of air flow with a given air pressure is obtained. The valve is then suitably sealed or shielded to prevent unauthorized changes in adjustment, the arrangement shown including a convex shield 59 fixed to the valve stem by screw 60 and bearing against the face of control panel 61. The rate of air flow thus provided is selected to bring the test strip into contact as promptly as possible with the pressure applying surface such as plate 26, without crushing or otherwise marring the strip upon initial impact against said plate. It has been found practical to adjust the rate of flow so that it will be appropriate both for bringing the test piece into testing position at a proper rate and for applying the testing pressure at a desirable rate.

The test block 65 may be of standard type, the form illustrated being cylindrical with a circular recess 66 in its upper face. A retaining disk 67 is removably and rotatably fitted into recess 66 and held centrally therein by pin 68 extending downwardly from the center of disk 67 and fitting into socket 69 in block 65. The outer face 70 of disk 67 is accurately and uniformly spaced from the parallel inner face 71 of recess 66 to provide the proper clearance for holding the lower portion of test strip 72 firmly in place while permitting the endwise insertion of the strip; and interchangeable disks 67 of different diameters are provided to fit test material of different thicknesses. To facilitate insertion of the test strip a suitable vertical slot 73 (Fig. 5) of the same depth as recess 66 and tangent to face 71 thereof extends across the upper face of test block 65.

A suitable arrangement is provided for facilitating the rapid and accurate location of the test block 65 on platform 37 and its removal therefrom after testing. For this purpose the control panel 61 is provided with a suitable shelf 74 having its inner edge close to and in alignment with the testing platform 37 when in lowermost or loading position, a suitable hand pole 75 being provided in panel 61 above shelf 74. Appropriate block positioning means is provided on testing platform 37, and in the form illustrated consists of three studs 76 arranged to engage the cylindrical outer surface of test block 65 at intervals of about 90° when the block is in testing position centered over piston 35 and below pressure plate 26. Studs 76 are suitably located to permit the test block to be slid into position and removed readily through hand hole 75.

In operation the apparatus is first set for given testing conditions. For instance, the corrugated board liner material is generally provided in thicknesses of nine thousandths, sixteen thousandths, and thirty thousandths of an inch respectively. The apparatus illustrated is provided with three control lines, each of which may be set to test strips of one of the enumerated thicknesses. In this particular set-up the pressure in air supply tank 47 should be maintained at 100 pounds per square inch through proper setting of reducing valve 49, the compressor 48 being normally adapted to produce a pressure of 150 pounds per square inch in order to maintain the uniform desired pressure in tank 47.

The control line 52 may be adjusted for testing test strips of nine thousandths of an inch in thickness. For this purpose the reducing valve 56 is set for a pressure of 20 pounds per square inch, accurate setting being facilitated by observation of gauge 62. Velocity control nozzle 57 is adjusted under testing conditions until test dial 23 shows an increase in testing pressure at the proper rate, such as 10 pounds per second. The stem of nozzle 57 is then sealed as shown in Fig. 3. Line 53 may be similarly set to test material sixteen thousandths of an inch thick, with a pressure of 40 pounds; and line 54 may be likewise adjusted to test strips thirty thousandths of an inch thick, at a pressure of 60 pounds.

Test strips 72 are suitably fitted into test blocks 65, each block being arranged so that a strip may be slid endwise through slot 73 into the annular recess between disk 57 and the outer wall of recess 66, each strip being accurately cut so that its ends form a firm butt joint when the strip is completely inserted. With the valve 55 closed and the testing platform 37 in loading position, the operator slides a block 65 carrying a strip 72 across the shelf 74 and the platform 37 into position against studs 76. Valve 55 in the line set for testing strips of the appropriate thickness is then opened, and the air introduced beneath piston 32 raises platform 37 and the test block 65 thereon until the upper margin of strip 72 comes in contact with pressure plate 26, the air above piston 32 escaping through guideway 31. After contact is established the edgewise pressure on the strip is increased at a carefully calibrated automatically regulated uniform rate such as 10 pounds per second, and is registered on dial 23. When the strip starts to crumple its yielding will reduce the pressure on the scale, and the indicated pressure will drop, the highest pressure indicated on the scale representing the pressure at which that particular strip fails.

The operator then depresses treadle 77 against spring 78, opening relief valve 79 connected to treadle 77 and located in relief line 80 extending from air line 45, permitting the air under piston 32 to escape. The weight of the piston and associated parts is sufficient to cause the piston to descend, the drop being cushioned by washer 38; and the apparatus is in position for removal of the test block 65 and its replacement with another block already loaded. It has been found in practice that valve 55 may remain open while treadle 77 is down without serious loss of air, leaving the operator free to use both hands for insertion and removal of test blocks.

It will be apparent that the arrangement is highly convenient, rapid and accurate in operation, is adapted for ready adjustment and control, and provides uniform pressures and rates of pressure application which produce uniform and accurately comparable test results. While pneumatic operation has been described and possesses definite advantages in the specific type of testing that is illustrated, certain features of the invention are applicable to other testing systems, such as those of the hydraulic type. Other features of the testing mechanism may also be altered in the application of the control to different types of testing.

I have described what I believe to be the best embodiments of my invention. I do not wish, however, to be confined to the embodiment shown, but what I desire to cover by Letters Patent is set forth in the appended claims.

I claim:

1. Testing apparatus comprising a pair of relatively movable plates, pneumatically operated means for moving one of said plates and for applying pressure to a test piece between said plates and means for automatically regulating the rate of application of pressure comprising a source of air under pressure, a plurality of supply lines between the source of air under pressure and the pressure applying means, each supply line including: a valve, means for reducing the air pressure from said source to a predetermined pressure different for each supply line, and a velocity control nozzle for supplying the air under said predetermined pressure to the pressure applying means to increase the pressure therein at a predetermined uniform rate; and means indicating the pressure exerted by the first mentioned means upon the test piece.

2. Testing apparatus comprising a force measuring device, a pneumatically operated pressure applying unit mounted thereon, a plate carried by said unit for receiving interchangeable testing elements, a fixed abutment plate cooperating with said first mentioned plate for applying pressure to a testing element between said plates; a panel shielding said unit and provided with an opening for insertion and removal of said testing elements; a source of air under pressure, and control means connecting the source of air with the pressure applying unit including a plurality of control lines mounted on the panel for supplying different maximum pressures to said unit and control devices in said lines mounted on the panel in proximity to the testing unit, and operable from the front of the panel.

THEODORE J. GROSS.